Sept. 9, 1958 W. HAYDEN 2,851,233
SEAM FOR JOINING ENDS OF STAINLESS STEEL WIRE CLOTH
Filed Sept. 7, 1955
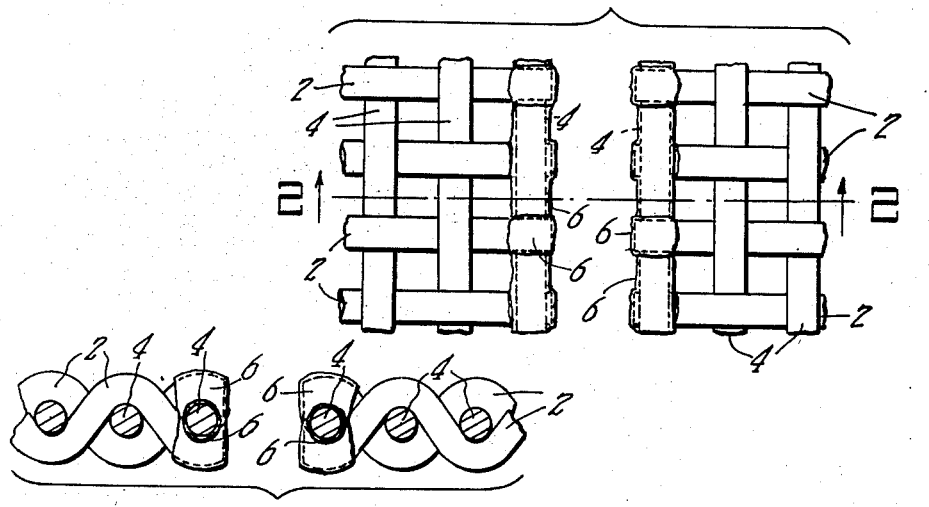
Fig. 1.
Fig. 2.
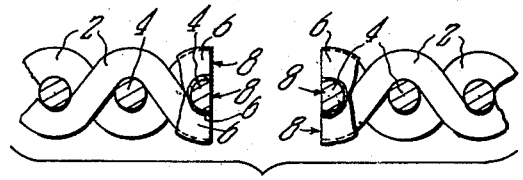
Fig. 3.
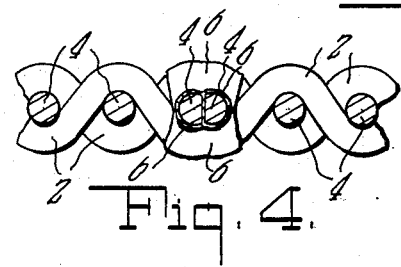
Fig. 4.
INVENTOR.
Wesley Hayden.
BY

2,851,233

SEAM FOR JOINING ENDS OF STAINLESS STEEL WIRE CLOTH

Wesley Hayden, Springfield, Mass.

Application September 7, 1955, Serial No. 532,820

1 Claim. (Cl. 245—10)

This invention relates to improvements in the Fourdrinier wire and covering for cylinder moulds of paper making machines and is directed more particularly to the seaming of wire cloth formed from interwoven elements of stainless steel to provide endless lengths or bands.

Wire cloth for Fourdrinier wire, cylinder covers and the like has been made from wires of bronze, alloys of brass and copper and non ferrous metals and the ends have been joined or seamed by welding or brazing with materials including silver, zinc, cadmium and the like.

Wire cloth made from stainless steel elements for use as mould coverings of Fourdrinier wires has been found to be superior to prior art wire cloth for the reason wire cloth of stainless steel is subject to a much less degree to the action of acids, sulphates, chlorine, sulphites, etc., which are to be found in ever increasing amounts in paper stock in present day papermaking.

Stainless steel wire cloth has greater tensile strength than prior art wire cloth and is more abrasive resistant as the wire passes over rolls and other components. Altogether a Fourdrinier wire has a longer useful life when made from stainless steel wire.

Seaming or joining of the ends of stainless steel wire cloth had presented problems. Where prior art brazing materials are used in connection with stainless steel wire cloth not only is brazing material likely to corrode under present day conditions but the prior art brazing materials do not possess strength in keeping with the strength of the cloth.

I have discovered that when the ends of stainless steel wire are brazed or welded together by the novel welding material of this invention that neither the wire nor the brazing material is subject to the action of acids wherefore it is possible to utilize the seamed wire cloth over a long period of time.

Therefore according to the invention stainless steel wire cloth is made use of for Fourdrinier wires and coverings and is seamed by novel means to the end that a Fourdrinier wire or covering and the seaming thereof is not only resistant to consituents of paper making stocks and abrasive action, but the cloth has great strength to the end that a longer useful life is possible.

Further objects and advantages of my invention will become apparent as the following description proceeds, and the features of novelty which characterize my invention will be pointed out with particularity in the claims annexed to and forming part of this specification.

In the drawings:

Fig. 1 is a plan view of end portions of Fourdrinier wire to be joined according to the invention and showing brazing material applied thereto;

Fig. 2 is a sectional view on the line 2—2 of Fig. 1;

Fig. 3 is a view similar to Fig. 2 showing the ends of the Fourdrinier wire prepared for brazing; and Fig. 4 is a sectional view through the ends of a Fourdrinier wire in joined together relation.

In the practice of the invention a suitable flux is applied to opposite ends to be seamed of the wire cloth woven from stainless steel elements. Stainless steel is well known and is sometimes referred to as rustless steel.

Brazing material is then fused to the transverse weft elements and the ends of the warp elements at the ends of the wire cloth to be seamed.

In the drawings, 2 and 4 represent interwoven warp and weft wires. In Figs. 1 and 2 brazing material is represented by 6 which is fused to the ends of the warp wires 2 and the endmost weft wires 4.

The brazing material used according to the invention consists of an alloy of gold and nickel or of gold, nickel and chromium which have been found to fuse exceedingly well with stainless steel and is strong and resistant to acids and materials encountered in paper making stocks.

An alloy within the range of 82% gold and 18% nickel has been found to be very desirable as a brazing medium, and particularly where the gold is 75% and nickel 25% or the gold 82% and the nickel is 18%.

An alloy including not over 6% chromium, 72% gold and 22% nickel has also been found to be desirable and in all cases the gold to be used will be reasonably pure.

The alloys mentioned flow readily within a temperature range of 1400 deg. F. to 1900 deg. F. and will coat the end weft wires and ends of the warp wires in a manner suitable for brazing.

It has been found by use of the alloys in seaming stainless steel wire cloth that the seam is far superior to that where brazing material used for wire cloth made from bronze is employed. The alloy brazing material above is not only resistant to acids and the like but it adheres exceedingly well to the cloth elements to provide a stronger seam.

Subsequent to the coating step the ends of the warp elements and adjacent sides of the endmost weft elements are smoothed by filing, honing or the like so that the weft wires are somewhat flat for being disposed in contiguous relation.

Fig. 3 shows the ends of the warp wires 2 and sides of the endmost weft wires as they are made smooth as indicated at 8.

With the smooth ends of the warp elements and somewhat flat sides of the weft elements at the ends of the cloth held in contiguous relation heat is applied. The brazing alloy is melted or fused so that the warp and weft elements at the ends of the cloth are securely joined or seamed as the material cools. For the brazing operation the end portions of the wire cloth may be held by clamps or the like.

Fig. 4 illustrates the ends of the wire as joined or seamed as heat is applied while said ends of the wire are held in abutting relation.

As heat is applied within the before mentioned range the brazing alloy coating the weft wires and ends of the warp wires readily flows to accomplish the desired seaming.

The particular brazing alloy in combination with the stainless steel screen cloth provides a strong seam which does not possess unwanted stiffness so that the Fourdrinier in its movement readily moves around guide and other rolls and both the cloth and seaming are resistant to an abrasive action, acids and the like and possess great strength for a long useful life.

Various changes and modifications may be made in the practice of the invention without departing from the spirit and scope thereof and I desire to claim and secure by Letters Patent of the United States the following:

An endless band comprising, a length of woven cloth consisting of interwoven stainless steel warp and weft wires, opposite ends of said cloth being fused together by a brazing alloy of 72% gold, 22% nickel and a balance of chromium.

(References on following page)

References Cited in the file of this patent

UNITED STATES PATENTS

| | | |
|---|---|---|
| 959,517 | Griffith | May 31, 1910 |
| 1,017,662 | Franck | Feb. 20, 1912 |
| 1,189,194 | Eldred | June 27, 1916 |
| 1,248,506 | Lavine | Dec. 4, 1917 |
| 1,646,842 | Whiting | Oct. 25, 1927 |
| 1,647,822 | Williams | Nov. 1, 1927 |
| 1,922,940 | Franck | Aug. 15, 1933 |
| 2,162,947 | Gleeson | June 20, 1939 |
| 2,219,588 | Crossman et al. | Oct. 29, 1940 |
| 2,331,814 | Taylor | Oct. 12, 1943 |
| 2,373,117 | Hobrock | Apr. 10, 1945 |
| 2,374,995 | Hensel | May 1, 1945 |
| 2,496,052 | Hose et al. | Jan. 31, 1950 |
| 2,626,459 | Viles | Jan. 27, 1953 |
| 2,664,622 | Spitz | Jan. 5, 1954 |
| 2,698,813 | Pun Kien Koh | Jan. 4, 1955 |

OTHER REFERENCES

"Brazing Manual," prepared by American Welding Society; Reinhold Publishing Corp., New York (page 116 relied on).